(12) United States Patent
Riva et al.

(10) Patent No.: US 12,367,226 B2
(45) Date of Patent: *Jul. 22, 2025

(54) OPERATING A DISTRIBUTED SEARCH INDEX IN A CONTENT DELIVERY NETWORK

(71) Applicant: Oramasearch Inc., San Francisco, CA (US)

(72) Inventors: Michele Riva, Carnate (IT); Paolo Insogna, Ferrazzano (IT); Issac Roth, San Francisco, CA (US)

(73) Assignee: Oramasearch Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,165

(22) Filed: Jan. 29, 2024

(65) Prior Publication Data

US 2025/0036666 A1  Jan. 30, 2025

Related U.S. Application Data

(63) Continuation of application No. 18/359,596, filed on Jul. 26, 2023, now Pat. No. 11,921,759.

(51) Int. Cl.
*G06F 16/30* (2019.01)
*G06F 16/13* (2019.01)
(Continued)

(52) U.S. Cl.
CPC ......... *G06F 16/325* (2019.01); *G06F 16/134* (2019.01); *G06F 16/14* (2019.01); *G06F 16/334* (2019.01); *G06F 16/338* (2019.01)

(58) Field of Classification Search
CPC ...... G06F 16/134; G06F 16/14; G06F 16/325; G06F 16/334; G06F 16/338
See application file for complete search history.

(56) References Cited

U.S. PATENT DOCUMENTS 11,516,069 B1 * 11/2022 Satish ................... H04L 43/067
2007/0288662 A1 12/2007 Chen
(Continued)

OTHER PUBLICATIONS

"NSF III-1718680: Index Sharding and Query Routing in Distributed Search Engines", retrieved from http://engineering.nyu.edu/~suel/pdse/ on Jul. 20, 2023, 9 pgs.
(Continued)

*Primary Examiner* — Diedra McQuitery
(74) *Attorney, Agent, or Firm* — Seed Intellectual Property Law Group LLP

(57) ABSTRACT

A facility for distributing a search index for a corpus of documents is described. The facility accesses multiple search index segments collectively making up the search index. Each of the segments is executable to traverse an index subtree embedded in the segment to find in the index subtree a node representing a query term specified in an argument. Each of the segments corresponds to a particular indexed document field that is indexed by the search index. For each of the segments, the index subtree embedded the segment has nodes representing query terms that all produce a particular hash result. The facility calls a programmatic publication interface for a content delivery network to publish the plurality of search index segments on the content delivery network.

24 Claims, 5 Drawing Sheets

(51) Int. Cl.
*G06F 16/14* (2019.01)
*G06F 16/31* (2019.01)
*G06F 16/334* (2025.01)
*G06F 16/338* (2019.01)

(56) References Cited

U.S. PATENT DOCUMENTS

| | | | |
|---|---|---|---|
| 2016/0092594 | A1 | 3/2016 | Deshmukh et al. |
| 2016/0283304 | A1* | 9/2016 | Horikawa ............ G06F 11/3452 |
| 2017/0068678 | A1 | 3/2017 | Tripathi et al. |
| 2018/0357304 | A1 | 12/2018 | Balasubrahmanian et al. |
| 2020/0249878 | A1* | 8/2020 | Bismuth ............... G06F 3/0658 |
| 2022/0164396 | A1* | 5/2022 | Seth .................. G06F 16/90344 |
| 2022/0318252 | A1 | 10/2022 | Luciani et al. |
| 2022/0327116 | A1 | 10/2022 | Borate et al. |
| 2022/0414130 | A1* | 12/2022 | Master Ben-Dor ... G06F 16/683 |
| 2023/0081324 | A1 | 3/2023 | Jiang et al. |

OTHER PUBLICATIONS

"Size your shards", retrieved from https://www.elastic.co/guide/en/elasticsearch/reference/current/size-your-shards.html on Jul. 20, 2023, 9 pgs.

Office Action, dated Sep. 13, 2024, for U.S. Appl. No. 18/488,827. (16 pages).

* cited by examiner

OPERATING A DISTRIBUTED SEARCH INDEX IN A CONTENT DELIVERY NETWORK

CROSS-REFERENCE TO RELATED APPLICATIONS

This Application is a continuation of U.S. patent application Ser. No. 18/359,596, filed Jul. 26, 2023, and entitled "OPERATING A DISTRIBUTED SEARCH INDEX IN A CONTENT DELIVERY NETWORK," which is hereby incorporated by reference in its entirety.

This Application is related to U.S. patent application Ser. No. 18/359,600, filed Jul. 26, 2023 (now U.S. Pat. No. 11,829,426), and entitled "OPERATING A DISTRIBUTED SEARCH INDEX IN A CONTENT DELIVERY NETWORK," which is hereby incorporated by reference in its entirety.

In cases where the present application conflicts with a document incorporated by reference, the present application controls.

BACKGROUND

Search involves identifying documents in a corpus—such as webpage available via the internet—that satisfy a query. In some cases, the documents in the corpus contain multiple fields, and a query may contain query strings each specified for a different one of these fields.

Search is conventionally performed by constructing a monolithic index for the corpus that is stored on a search server. The search server receives queries from client devices, uses the index to generate a query result for each, and responds with that query result.

DETAILED DESCRIPTION

Figure 1:
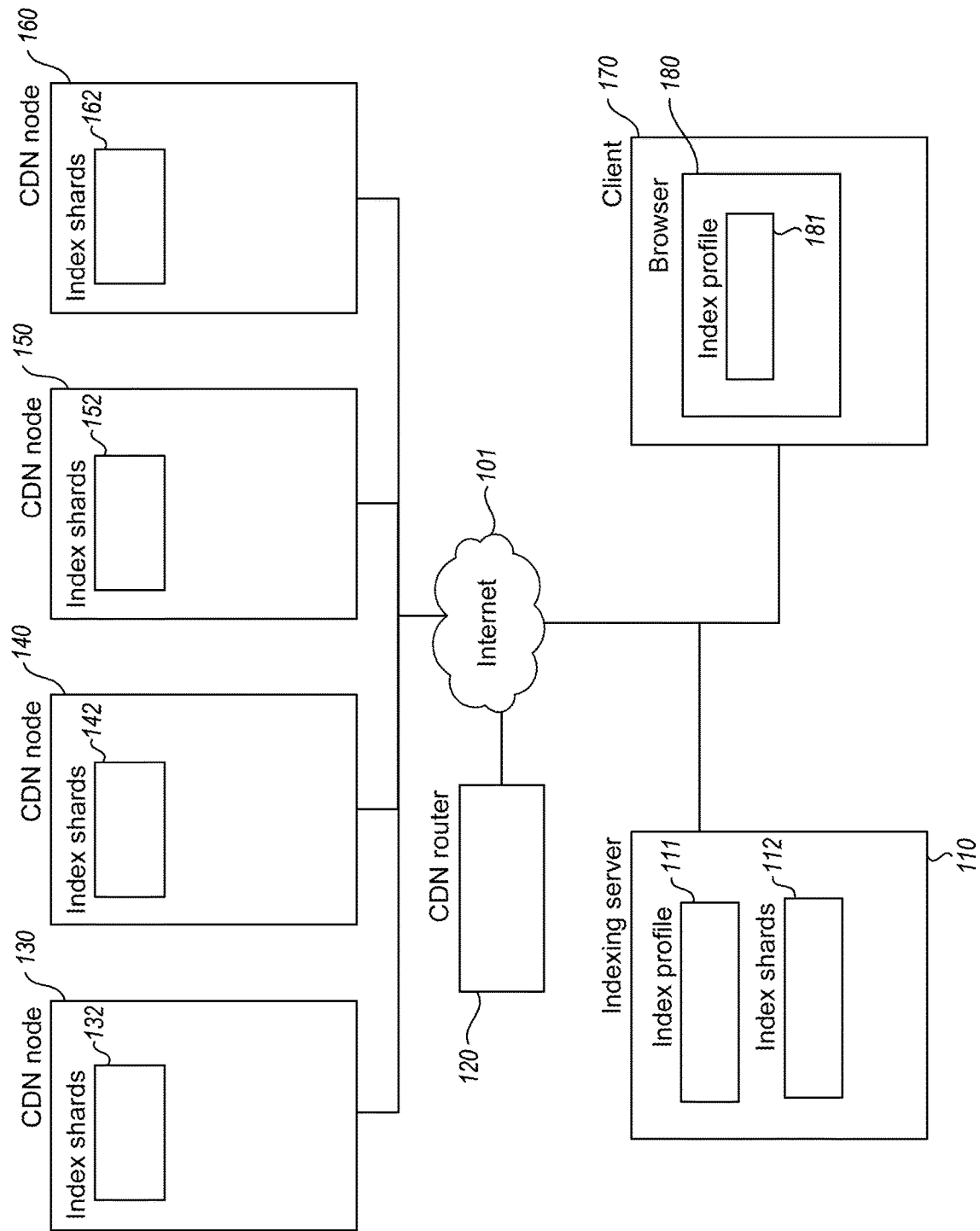
FIG. 1 is a network diagram showing an environment in which the facility operates in some embodiments.

The inventors have recognized significant disadvantages in the conventional approach to performing search. In particular, queries processed by a query server can have significant latency, high processing cost, and difficulty in scaling to higher volumes of queries.

In response to recognizing these disadvantages, the inventors have conceived and reduced to practice a software and/or hardware facility for operating a distributed search index in a content delivery network ("the facility").

In some embodiments, the facility distributes its search engine via a content delivery network ("CDN") that is made up of a significant number of geographically-distributed nodes that are in some cases strategically placed to be close to significant populations of users, either in terms of geographic distance or in terms of network connectivity. When a user submits a request to the CDN, the CDN routes it to the best CDN node to satisfy the request. Thus, without having to establish, maintain, or operate these geographically-distributed nodes, the operator of the facility is able to make its search index available to users with the low network latency, failure recovery capabilities, and ability to scale to increasing demand that are all inherent in CDNs.

In some embodiments, the facility processes a query generated on a client device against its search index in a CDN node where the index is stored, such as one of the CDN nodes where the index is stored that is judged to be closest to the client device in some sense. In some embodiments, the facility causes the client device to download the index to the client from a CDN node where the index is stored, and processes the query against the index in the client. In these embodiments, the index or parts of it can be cached on the client, such as in the client's browser cache, for use without re-downloading to resolve future queries.

In some embodiments, the facility constructs its index in a segmented, or "sharded" fashion, such that many queries can be processed using only a small subset of the shards that make up the index. In some embodiments, each shard relates to a single indexed field.

In some embodiments, the facility constructs the index by creating an empty index tree for each indexed field, then looping through the documents of the corpus, and, for each indexed field, adding each term appearing in the indexed field of the document to the appropriate position in the field's index tree together with the document's id. In various embodiments, the query terms into which the facility decomposes each query strand are words, phrases, word roots, word stems, etc. After an index tree is built for all of the documents of the corpus for each indexed field, the facility divides each of these trees into subtrees each no larger than a maximum subtree size. The facility then packages these subtrees each into their own shard, in some embodiments as a JavaScript routine that takes a query term as an argument and traverses an index subtree statically assigned inside the routine to locate the term and note the associated document ids. Each shard is named in a way that identifies the index (such as by corpus and version), the indexed field that it covers, and the position of its subtree among the subtrees created for the index field. In some embodiments, rather than subdividing a field's index tree after its construction is complete, the facility splits it into subtrees over the course of its construction each time a subtree's size exceeds the maximum size, or initially creates it to have its ultimate number of subtrees.

The facility takes two further actions to make the index usable: (1) it publishes the shards to a CDN, and (2) it distributes to or makes retrievable by search clients a profile of the index, including, for example, the name of the corpus, version of the index, and a schema specifying for each indexed field its name, data type, and number of shards.

The client uses the index metadata to formulate a query against the index. In particular, it uses the schema to receive query strings for one or more fields, such as from a user. For each term in each query string, it uses hashing techniques to identify one or more shards for the field that contain the subtrees in which the term can be found, builds the filenames for those shards, and dispatches a request to the CDN for each filename with the corresponding query term.

In some embodiments, the request is an execute request that instructs the CDN node in which the named shard is resident to load the shard if it is not already resident in working memory, execute it against the argument query term, and return the document ids specified by the node at the shard's subtree that matches that term. In some embodiments, the request is a retrieve request that instructs the CDN node to return the named shard; when the shard is returned, the client executes the shard against the query term. (In the case of retrieve requests, the shards of an index accumulate in the client's browser cache over time, reducing CDN invocations and associated latency for future queries.) The client then merges the document id lists produced by the executed shards to construct and display the query result.

In some embodiments, rather than dispatching individual shard requests for a query from the client, the client sends a single execute request to the CDN for a query dispatch routine that performs this task in the CDN. In some embodiments, the facility issues artificial requests to some or all of the CDN nodes for some or all of the index's shards to ensure that they are retained in working memory, so that the satisfaction of substantive shard requests is not delayed by loading them from persistent storage. In some embodiments, the facility sends these artificial requests to the CDN from a routine that the facility executes in the CDN.

In some embodiments, the facility provides hooks to invoke custom routines at points during the construction of the index and/or processing queries, such as those supplied by or developed for a customer for which the index is constructed and operated. In various embodiments, the facility provides these hooks at points such as before tokenization, after tokenization, before indexing, before search, before insertion in results, and after insertion in results. In some embodiments, the facility enables a custom tokenizer to be substituted for the facility's default tokenizer.

By operating in some or all of the ways described above, when compared to conventional search techniques, the facility provides lower cost, greater speed, the ability to quickly and automatically scale to arbitrary demand levels, and the ability to automatically failover to redundant resources hardware. In particular, the facility's use of CDNs takes advantage of generally lower pricing for executing code there than in other cloud or dedicated server contexts; the facility's execution of search on the client is accomplished with computing cycles that have no marginal pecuniary cost; small network latency to the closest CDN node; CDNs' innate ability to scale quickly, automatically, and sometimes predictively, both to total load and demand from particular geographic or network locations; and CDN's innate ability to fail around inoperative CDN nodes.

FIG. 1 is a network diagram showing an environment in which the facility operates in some embodiments. An indexing server 110 accesses a corpus of documents (not shown) for which an index is to be created and used to satisfy queries, such as via the Internet 101. Each document in the corpus is identified by a document identifier, which can be used to retrieve it. As is discussed in greater detail below, the indexing server generates an index for the corpus made up of an index profile 111 containing metadata for the index, as well as multiple index shards 112, each containing a subtree of the index that collectively make up the index. In order to activate the index, the facility publishes the shards of the index 112 to a content delivery network (CDN). In various embodiments, the CDN is the Alibaba Cloud CDN, the Cloudflare CDN, the Baluga CDN, the Fastly CDN, the Amazon Cloud Front CDN, or CDNs from a variety of other providers. While the facility typically performs only a single publishing request for each of the index shards, the effect of the publishing is to distribute the index shards to multiple nodes 130, 140, 150, and 160 of the CDN, based on a process managed and operated automatically by the CDN.

Activation of the index also involves distribution of the index profile to a number of search client devices 170, such as client devices running a browser 180. When a user of the client inputs a query against the index, the facility's code on the client identifies a subset of the shards that are implicated by the query, and sends requests to the CDN for these identified shards, via a router 120 of the CDN. Each request is for a particular shard of the index corresponding to a particular indexed field, and specifies a query term being searched for in that field. The router redirects each request to the CDN node best-equipped to satisfy the request, in that it stores a copy of the index shard, it has a short and/or inexpensive path to the client, it is underutilized or at least not overutilized, it has a lower pecuniary cost, etc. In resolving each of these redirected CDN requests, the target CDN node loads the identified index shard into working memory if it is not already resident there, and executes the shard's JavaScript code to traverse the contained subtree in search of the query term identified by the request. The CDN returns from this invocation to the client with a list of the document IDs of documents identified with the term by the shard's subtree. On the client, the facility merges the list of document IDs returned from different shards of the index for the query, and uses this merged list to generate a query result.

Figure 2:
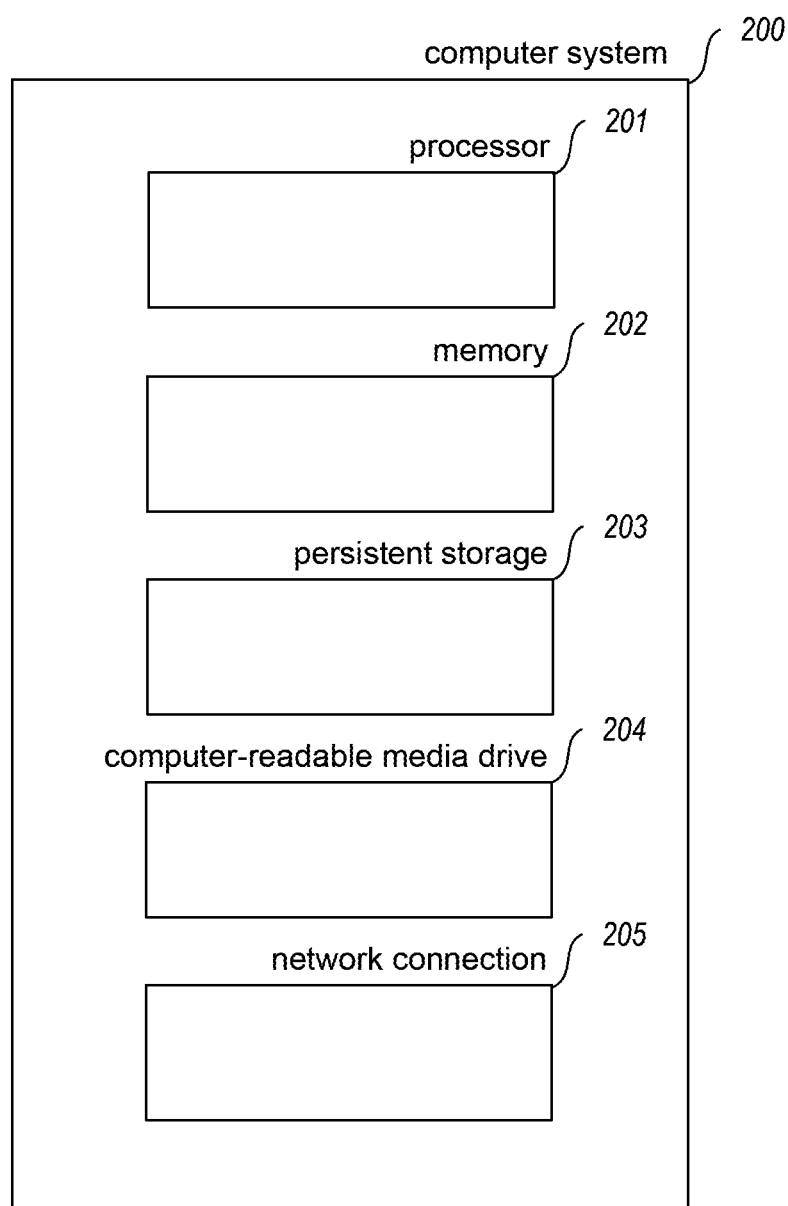
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates, including those shown in FIG. 1. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
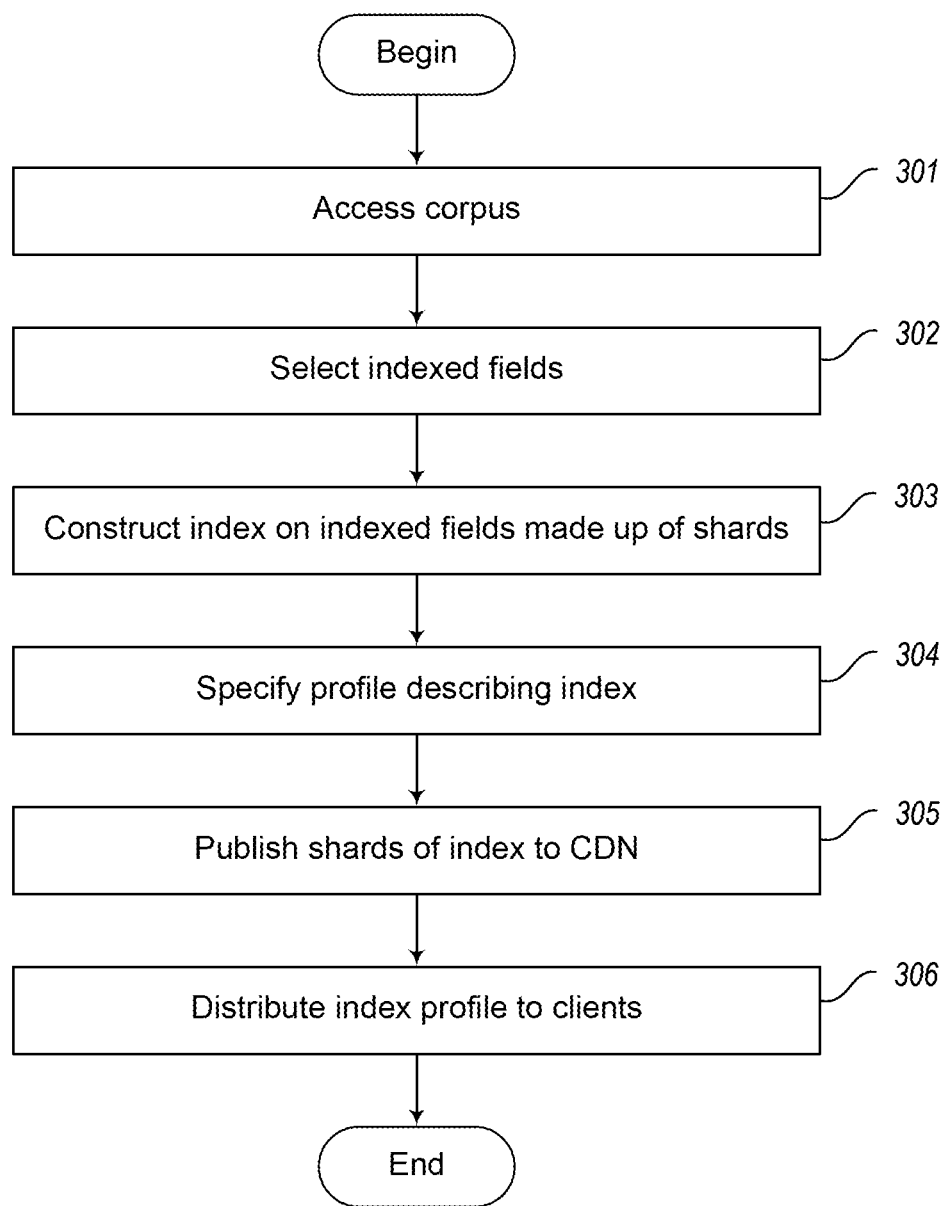
FIG. 3 is a flow diagram showing a process performed by the facility in some embodiments to construct an index for a corpus of documents.

FIG. 3 is a flow diagram showing a process performed by the facility in some embodiments to construct an index for a corpus of documents. In act 301, the facility accesses a corpus identified by the customer for which the index is being constructed. In some embodiments, after act 301, the facility executes a hooked routine that can adjust the contents of the accessed corpus for indexing, such as by adding or removing documents, adding or removing individual fields for some or all of the documents, modifying the contents of fields for some or all of the documents, etc. In act 302, the facility selects fields of the documents in the corpus that are to be indexed, so that queries against the index can find query terms that occur within these fields in some of the documents of the corpus. In various embodiments, the facility causes the index fields to be selected automatically, manually, or by a combination of automatic and manual efforts. In one example, for a corpus in which each document relates to a different person, the facility identifies a textual last name field, a numerical age field, and a textual biography field as the indexed fields.

In act 303, the facility constructs an index on the fields of the corpus selected in act 302 as indexed fields. The constructed index is made up of shards. In some embodiments, the facility constructs the index by creating an empty index tree for each indexed field, then looping through the documents of the corpus, and, for each indexed field, adding each term appearing in the indexed field of the document to the appropriate position in the field's index tree together with the document's id. In some embodiments, after an index tree is built for all of the documents of the corpus for each indexed field, the facility divides each of these trees into subtrees each no larger than a maximum subtree size.

In some embodiments, where the size of the total index tree can be predicted for a field before its construction, the facility creates at the outset a number of subtrees for the field that will collectively be adequate—in light of the maximum size of a shard that can be accommodated in the CDN's routine execution environment to accommodate an overall tree for the field of that size. The facility then uses a round-robin hashing algorithm to select which of these subtrees for the field will contain each term that occurs in the field in at least one document of the corpus. In some embodiments, such as embodiments in which it is not clear how large the overall search tree will be for the field, the facility begins by creating a single tree for the field, which it progressively splits into more and more subtrees as the maximum subtree size is reached. In some embodiments, for this hashing approach, the facility uses determinative consistent hashing to select among the subtrees to contain a particular term present in the field in at least one of the documents of the corpus.

Figure 4:
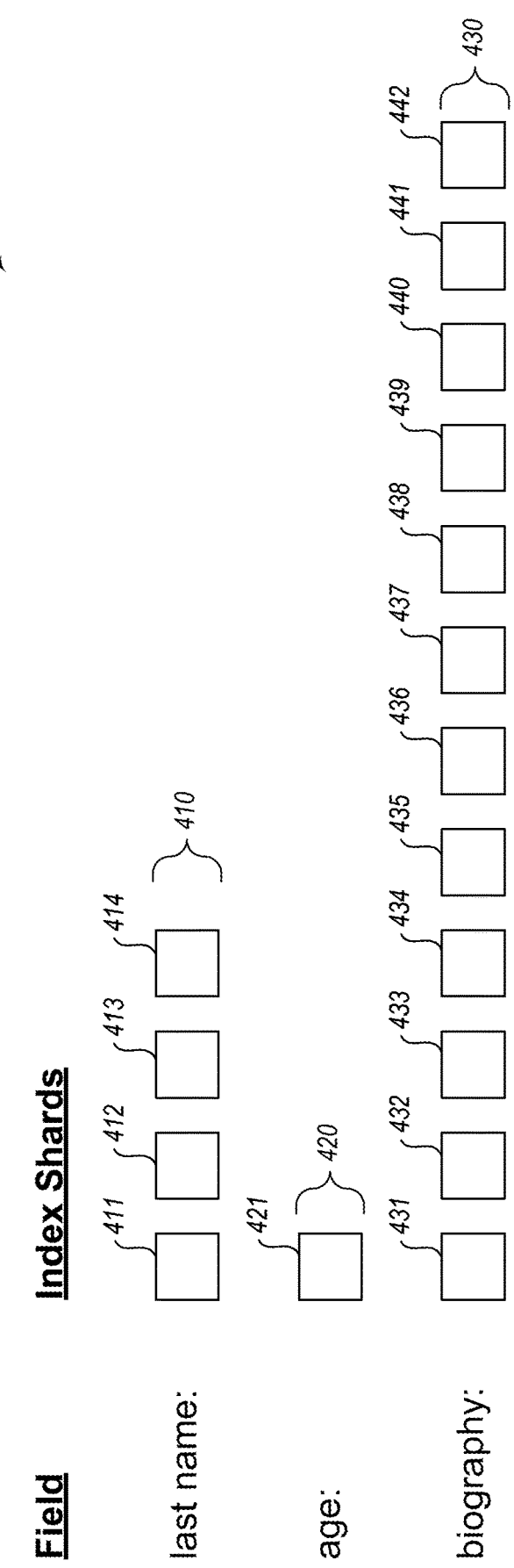
FIG. 4 is a data structure diagram showing the shards that make up a sample index generated by the facility.

The facility then packages these subtrees each into their own shard, in some embodiments as a JavaScript routine that takes a query term as an argument and traverses an index subtree statically assigned inside the routine to locate the term and note the associated document ids. Each shard is named in a way that identified the index (such as by corpus and index version, in various embodiments an ordinal version number or a date and/or the time at which the index is created), the indexed field that it covers, and the position of its subtree among the subtrees created for the index field. The index shards created by the facility for the example index are shown in FIG. 4 and discussed below. In some embodiments, after act 303, the facility executes a hooked routine to modify the constructed index before its publication.

In act 304, the facility specifies a profile describing an index. In some embodiments, this index profile contains information such as the customer for which the index was generated; the corpus against which the index was generated; a version of the index, such as an ordinal version number or a creation date and/or time; and a schema that identifies each indexed field, such as by field name or field number, and provides the data type of the field, and the number of shards created for the field. In some embodiments, the schema further specifies for each field the hashing approach used to select the appropriate charge for a particular term. In some embodiments, the hashing approach is implied based upon the data type of the field, or uniform across all data types. The table below shows the schema included in the indexed profile in the example.

TABLE 1

| Field | Data Type | Number of Shards |
|---|---|---|
| Last Name | String | 4 |
| Age | Number | 1 |
| Biography | String | 12 |

To make the index usable to perform queries, the facility first publishes the shards to a CDN in act 305. In some embodiments, the facility selects a CDN capable of executing JavaScript routines or other code in its nodes, such as using Edge Routines on the Alibaba Cloud CDN, Cloudflare Workers, Beluga CDN dynamic content, Compute@Edge by the Fastly CDN, or Amazon CloudFront Functions or Lambda@Edge Functions. For example, in some embodiments, the facility generates each shard to execute in the ColudflareWorkers environment as described by How Workers Works, available at developers.cloudflare.com/workers/learning/how-workers-works, which is hereby incorporated by reference in its entirety. In cases where a document incorporated by reference herein conflicts with this application, this application controls.

In act 306, the facility distributes the index profile specified in act 304 to clients, such as by transmitting it autonomously to clients or making it available for retrieval by clients. After act 306, this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 4 is a data structure diagram showing the shards that make up a sample index generated by the facility. Within the index 400, four shards 411-414 contain subtrees of the index tree for the last name index field 410. One shard 421 contains subtree of the index tree for the age index field 420. Twelve shards 431-442 contain subtrees of the index tree for the biography index field 430. In some embodiments, the number of shards established by the facility for a field depends on the size of a field, its data type, and/or the diversity of its contents across documents of the corpus.

Figure 5:
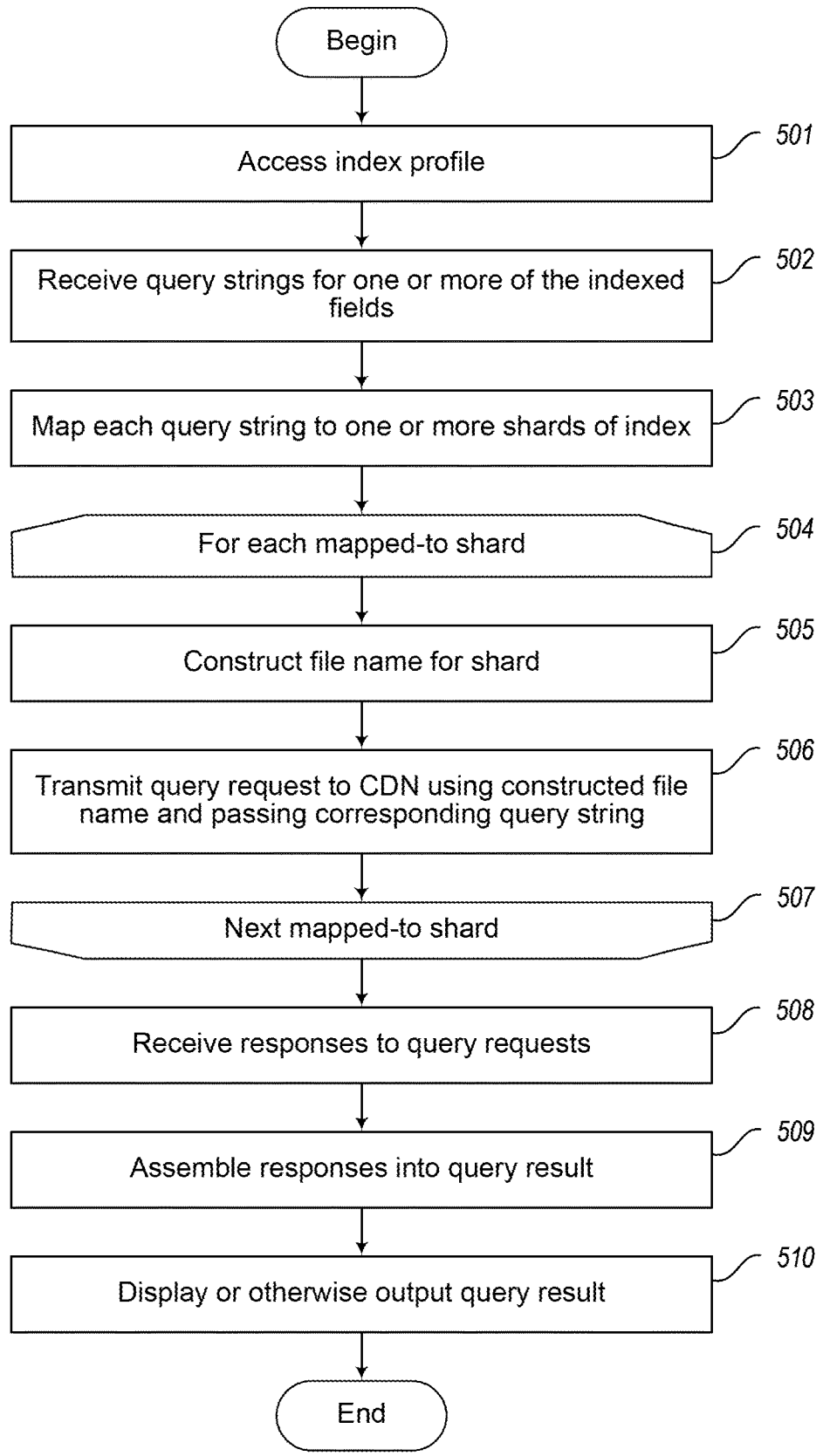
FIG. 5 is a flow diagram showing a process performed by the facility in some embodiments to perform a query.

FIG. 5 is a flow diagram showing a process performed by the facility in some embodiments to perform a query. In act 501, the facility accesses the index profile for the index. In some embodiments, the facility does so after a user of the client selects among different indices whose profiles have been received by the client. In act 502, the facility receives from a user of the client query strings for each of one or more of the index fields identified by the index profile. For example, in some embodiments the facility displays, for each indexed field, a textbox control into which the user can type a query string for the field. In some embodiments, the facility type-checks the query strings to ensure that they are consistent with the type of each field, and displays an error for any query strings that are inconsistent with the type of the field into whose textbox it was typed. In the example, the facility receives the following query:

TABLE 2

| Field | Query String |
|---|---|
| Last Name | Ambrose |
| Age | |
| Biography | Masters Degree |

In act 503, the facility maps each query string to one or more shards of the index. In some embodiments, the facility performs a particular process with respect to each of the indexed fields for which a query string was received. In particular, the facility uses the number of shards for the field and the type of the field to map from the query term to the shard in which the query term is expected to be found. In the example, the facility maps the query string "Ambrose" in the last name field to a single one of the last name index shards, and maps the query string "masters degree" for the biography field to two of the index shards with the biograph field, each corresponding to a different one of the two words of the phrase "masters degree."

In acts 504-507, the facility loops through each shard that is mapped to in act 503. In act 505, the facility constructs the name for the shard. In some embodiments, the name is constructed by concatenating groups of one or more characters, each representing one of the following pieces of information: the identity of the facility and/or its operator; the identity of a customer for which the index is being constructed; the identity of the corpus for which the index is being constructed; a version or creation time of the index to distinguish it from other indices generated by the facility for this corpus at earlier times; the identity of the field; and the number of the shard among the shards created for this field. In act 506, the facility transmits a query request to the CDN using the file name constructed in act 505, and passing the query term that was mapped to the shard, or, in some embodiments, the entire query string for the field. In act 507, if additional mapped-to shards remain to be processed, then the facility continues in act 504 to process the next mapped-to shard, else the facility continues in act 508. In the example, the facility transmits three requests to the CDM: a request for the shard that the last name Ambrose maps to, with that term; the shard for the biography field that the term masters maps to, with that term; and the shard for the biography field that the term degree maps to, with that term.

In act 508, the facility receives responses to the query request transmitted in act 506. In the example, the facility receives three responses from the CDN containing document ids identifying documents that have "Ambrose" in the last name field; those that have "masters" in the biography field; and those that have "degree" in the biography field. In some embodiments, after act 508, the facility executes a hooked routine that can modify the received responses to query requests.

In act 509, the facility assembles the responses received in act 508 into a query result. In some embodiments, this involves merging lists of document identifiers received in each of the responses into a master list of document identifiers, and retrieving biographical information about documents using their document identifiers. By merging the three document ID lists received in the example, the facility obtains a search result containing the documents that have Ambrose in the last name field, and masters and degree in the biography field.

In some embodiments, the facility performs the merging by using insertion sort in creating a master list of document identifiers from the per-term lists of document identifiers each generated by traversing a subtree with respect to a particular term. In some embodiments, the elements of the master list each have a count or other score that is augmented for each of the individual lists that the master list document identifier was on. At the end of this process, the facility can filter and/or sort the documents in the query result based upon the counters or other scores produced for the document ids in this process. In some embodiments, the list of document ids attached to each node of each shard subtree is stored in sort order—e.g., in increasing order of document id value, and thus document id per shard returned document id lists are each themselves in sort order. In some embodiments, the facility merges these lists by establishing a position pointer at the beginning of these individual document id lists, and advancing them in a coordinated way, so that the document id is monotonically increasing in the traversal across all of the individual lists as the facility generates the master list.

In some embodiments, after act 509, the facility executes a hooked routine that can modify the query result created in act 509. In act 510, the facility displays the query result created in act 509, or otherwise outputs it. After act 510, this process concludes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, comprising:
receiving a query that specifies, for each of at least a portion of one or more fields of a corpus of documents indexed by a search index comprised of index shard, a query string containing one or more query terms;
for each of the indexed fields for which the query contains a query string:
for each of the query terms contained by the query string for the indexed field:
using a field name that identifies of the indexed field and the query term to select at least one of the index shards of the search index;
for each of the at least one selected index shards, sending to a content delivery network hosting the search index a shard execution request identifying both the selected index shard and the query term; and
receiving from the content delivery network a response to the shard execution request that contains a list of document ids identifying documents of the corpus containing the query term in the indexed field,
such that, across the indexed fields for which the query contains a query string and the query terms contained by the query string for each indexed field, a plurality of responses are received that collectively contain a plurality of lists of document ids, the method further comprising:

merging the plurality of lists of document ids contained by the plurality of received responses to obtain a query result identifying documents of the corpus that satisfy the query.

2. The method of claim 1, further comprising:

causing the obtained query result to be displayed.

3. The method of claim 1 wherein, for a distinguished one of the indexed fields for which the query contains a query string, the selection uses a round-robin hashing scheme specified for the data type of the distinguished indexed field.

4. The method of claim 1 wherein, for a distinguished one of the indexed fields for which the query contains a query string, the selection uses a consistent hashing scheme specified for the data type of the distinguished indexed field.

5. The method of claim 1 wherein the merging comprises initializing a master sorted list of document ids;

traversing the lists of document ids contained by the received responses and, for each document id in each list:

searching for the document id in a master sorted list of document ids;

where the document id is already present in the master sorted list of document IDs, incrementing its score; and where the document id is not already present in the master sorted list of document IDs, inserting the document ID into the master sorted list of document IDs in a position that maintains the sorted quality of the master sorted list of document IDs, with a score having an initialization value.

6. The method of claim 5, further comprising:

filtering the query result to identify only documents of the corpus whose document IDs have a score in the master sorted list that exceeds a threshold.

7. One or more instances of non-transitory computer-readable media having contents configured to cause a computing system to perform a method, the method comprising:

receiving a query that specifies, for each of at least a portion of one or more fields of a corpus of documents indexed by a search index comprised of index shard, a query string containing one or more query terms;

for each of the indexed fields for which the query contains a query string:

for each of the query terms contained by the query string for the indexed field:

using a field name that identifies of the indexed field and the query term to select at least one of the index shards of the search index;

for each of the index shards selected for the indexed field:

sending to a content delivery network hosting the search index a shard retrieval request identifying the selected index shard; and receiving from the content delivery network a response to the shard retrieval request that contains the identified index shard;

for each of the query terms for which the identified index shard was identified:

executing the identified index shard with respect to the query term to obtain a list of document ids identifying documents of the corpus containing the query term in the indexed field; and merging the lists of document ids contained by the received responses to obtain a query result identifying documents of the corpus that satisfy the query.

8. The one or more instances of computer-readable media of claim 7, the method further comprising:

causing the obtained query result to be displayed.

9. The one or more instances of computer-readable media of claim 7 wherein, for a distinguished one of the indexed fields for which the query contains a query string, the selection uses a round-robin hashing scheme specified for the data type of the distinguished indexed field.

10. The one or more instances of computer-readable media of claim 7 wherein, for a distinguished one of the indexed fields for which the query contains a query string, the selection uses a consistent hashing scheme specified for the data type of the distinguished indexed field.

11. The one or more instances of computer-readable media of claim 7 wherein the merging comprises:

initializing a master sorted list of document ids;

traversing the lists of document ids contained by the received responses and, for each document id in each list:

searching for the document id in a master sorted list of document ids;

where the document id is already present in the master sorted list of document IDs, incrementing its score; and where the document id is not already present in the master sorted list of document IDs, inserting the document ID into the master sorted list of document IDs in a position that maintains the sorted quality of the master sorted list of document IDs, with a score having an initialization value.

12. The one or more instances of computer-readable media of claim 11, the method further comprising:

filtering the query result to identify only documents of the corpus whose document IDs have a score in the master sorted list that exceeds a threshold.

13. One or more instances of non-transitory computer-readable media having contents configured to cause a computing system to perform a method, the method comprising:

receiving a query that specifies, for each of at least a portion of one or more fields of a corpus of documents indexed by a search index comprised of index shard, a query string containing one or more query terms;

for each of the indexed fields for which the query contains a query string:

for each of the query terms contained by the query string for the indexed field:

using a field name that identifies of the indexed field and the query term to select at least one of the index shards of the search index that corresponds to the field;

for each of the at least one selected index shards, sending to a content delivery network hosting the search index a shard execution request identifying both the selected index shard and the query term; and receiving from the content delivery network a response to the shard execution request that contains a list of document ids identifying documents of the corpus containing the query term in the indexed field;

such that, across the indexed fields for which the query contains a query string and the query terms contained by the query string for each indexed field, a plurality of responses are received that collectively contain a plurality of lists of document ids, the method further comprising:

merging the plurality of lists of document ids contained by the plurality of received responses to obtain a query result identifying documents of the corpus that satisfy the query.

14. The one or more instances of non-transitory computer-readable media of claim 13, the method further comprising:
    causing the obtained query result to be displayed.

15. The one or more instances of non-transitory computer-readable media of claim 13 wherein, for a distinguished one of the indexed fields for which the query contains a query string, the selection uses a round-robin hashing scheme specified for the data type of the distinguished indexed field.

16. The one or more instances of non-transitory computer-readable media of claim 13 wherein, for a distinguished one of the indexed fields for which the query contains a query string, the selection uses a consistent hashing scheme specified for the data type of the distinguished indexed field.

17. The one or more instances of non-transitory computer-readable media of claim 13 wherein the merging comprises
    initializing a master sorted list of document ids;
    traversing the lists of document ids contained by the received responses and, for each document id in each list:
        searching for the document id in a master sorted list of document ids;
        where the document id is already present in the master sorted list of document IDs, incrementing its score; and
        where the document id is not already present in the master sorted list of document IDs, inserting the document ID into the master sorted list of document IDs in a position that maintains a sorted quality of the master sorted list of document IDs, with a score having an initialization value.

18. The one or more instances of non-transitory computer-readable media of claim 17, further comprising:
    filtering the query result to identify only documents of the corpus whose document IDs have a score in the master sorted list that exceeds a threshold.

19. A method in a computing system, comprising:
    receiving a query that specifies, for each of at least a portion of one or more fields of a corpus of documents indexed by a search index comprised of index shard, a query string containing one or more query terms;
    for each of the indexed fields for which the query contains a query string:
        for each of the query terms contained by the query string for the indexed field:
            using a field name that identifies of the indexed field and the query term to select at least one of the index shards of the search index that corresponds to the field;
        for each of the index shards selected for the indexed field:
            sending to a content delivery network hosting the search index a shard retrieval request identifying the selected index shard; and
            receiving from the content delivery network a response to the shard retrieval request that contains the identified index shard;
        for each of the query terms for which the identified index shard was identified:
            executing the identified index shard with respect to the query term to obtain a list of document ids identifying documents of the corpus containing the query term in the indexed field; and
    merging the lists of document ids contained by the received responses to obtain a query result identifying documents of the corpus that satisfy the query.

20. The method of claim 19, further comprising:
causing the obtained query result to be displayed.

21. The method of claim 19 wherein, for a distinguished one of the indexed fields for which the query contains a query string, the selection uses a round-robin hashing scheme specified for the data type of the distinguished indexed field.

22. The method of claim 19 wherein, for a distinguished one of the indexed fields for which the query contains a query string, the selection uses a consistent hashing scheme specified for the data type of the distinguished indexed field.

23. The method of claim 19 wherein the merging comprises:
    initializing a master sorted list of document ids;
    traversing the lists of document ids contained by the received responses and, for each document id in each list:
        searching for the document id in a master sorted list of document ids;
        where the document id is already present in the master sorted list of document IDs, incrementing its score; and
        where the document id is not already present in the master sorted list of document IDs, inserting the document ID into the master sorted list of document IDs in a position that maintains a sorted quality of the master sorted list of document IDs, with a score having an initialization value.

24. The method of claim 23, further comprising:
filtering the query result to identify only documents of the corpus whose document IDs have a score in the master sorted list that exceeds a threshold.

* * * * *